United States Patent [19]

Yamamoto

[11] Patent Number: 4,989,077

[45] Date of Patent: Jan. 29, 1991

[54] PHOTOGRAPHIC PRINTER WITH MONITOR

[75] Inventor: Takashi Yamamoto, Kanagawa, Japan

[73] Assignee: Photo Film Co., Ltd., Kanagawa, Japan

[21] Appl. No.: 315,868

[22] Filed: Feb. 27, 1989

[30] Foreign Application Priority Data

Feb. 26, 1988 [JP] Japan .................................. 63-43452

[51] Int. Cl.$^5$ .......................... G03F 3/10; H04N 7/18; G03B 13/24
[52] U.S. Cl. ...................................... 358/76; 358/102; 358/214; 355/44
[58] Field of Search .................... 358/76, 102, 80, 209, 358/75, 75 J, 43, 206, 474, 488, 487, 214, 244; 355/44, 45, 203, 267, 78, 18; 353/124; 40/361

[56] References Cited

U.S. PATENT DOCUMENTS

| | | | |
|---|---|---|---|
| 4,435,077 | 3/1984 | Suzuki et al. | 355/45 |
| 4,485,406 | 11/1984 | Brownstein | 358/214 |
| 4,496,983 | 1/1985 | Takenaka | 358/287 |
| 4,603,966 | 8/1986 | Brownstein | 358/93 |
| 4,616,926 | 10/1986 | DiPietro et al. | 355/45 |
| 4,642,700 | 2/1987 | Ohta et al. | 358/214 |
| 4,809,064 | 2/1989 | Amos et al. | 355/45 |

FOREIGN PATENT DOCUMENTS 2072361 9/1981 United Kingdom .

Primary Examiner—James J. Groody
Assistant Examiner—Safet Metjahic
Attorney, Agent, or Firm—Sughrue, Mion, Zinn, Macpeak & Seas

[57] ABSTRACT

An erecting type printer is provided with a monitor for displaying the same image as the original image on the photographic film by imaging with an imaging device. The imaging device of which the read start position is arranged in the upper right hand corner receives a light reflected from a mirror disposed between photographic film and photosensitive material. The image displayed on the monitor is also the same as the original image on the photographic film in directional relation so that the operator can move the photographic film in the same direction as that of the screen of the monitor.

8 Claims, 3 Drawing Sheets

PHOTOGRAPHIC PRINTER WITH MONITOR

BACKGROUND OF THE INVENTION

1. Field of the Invention

The present invention relates to a photographic printer having a display device for monitoring images on a photographic film to be printed.

2. Background

Before photographic printing of an image of a photographic film, it is necessary to inspect each image for proper exposure and to set a frame having the image in a desired position in the printing optical path. For this filmsetting and inspection, the image is directly observed or monitored with a display device. In an inverted type of photographic printer in which the photographic film is placed in the lower portion and photographic paper is placed in the upper portion, direct observation is usually used. On the other hand, in an erecting type of printer in which the photographic film is placed in the upper portion and photographic paper is placed in the lower portion, the image is usually monitored by displaying the image on a screen of a display device.

In conventional erecting type photographic printers having a monitor, the right and left sides of the image on a display device are inverted relative to those of the original image on the photographic film. Therefore, when the operator desires to move the image on the display screen a little in one direction, for example, rightwardly the operator must inversely move the frame leftwardly in the film carrier. The operator must take care to move the photographic film in a reverse direction to the operator's natural feeling This operation causes the operator to be inconvenienced when positioning the frame It is therefore an object of the present invention to provide a photographic printer in which the direction of movement of an image on a display device coincides with the direction of movement of an original image of photographic film.

SUMMARY OF THE INVENTION

For achieving this and other objects and advantages of the present invention, a mirror is provided in the printing optical path between the photographic film with the emulsion layers down and the photographic paper disposed under the photographic film. The mirror reflects the printing light, which has passed through the photographic film, in a direction opposite to the direction of the operator The reflected light from the mirror is received by an imaging device in which a read start position is placed in the upper right hand corner when viewing from the side of the operator. The imaging device picks up the original image of the photographic film and an image corresponding to the original image is displayed on a screen of a monitor which is placed with the screen approximately perpendicular to the plane of the photographic film and facing the operator who sets the photographic film.

According to a preferred embodiment of the present invention, an image is displayed on the screen of the monitor, simulating a finished photographic print in order to enable the inspection for automatic exposure control of the printer.

According to another preferred embodiment of the present invention, the bottom of the original image is set in the film carrier toward the operator.

According to the present invention the displayed image on a monitor coincides with the original image in their directional relation. Therefore, the photographic film can be moved in the same direction in which the displayed image on the monitor is intended to move, making film-setting easier.

BRIEF DESCRIPTION OF THE DRAWINGS

These and other objects and features of the invention will be understood by reference to the following description, taken in connection with the accompanying drawing in which.

DETAILED DESCRIPTION OF THE INVENTION

Figure 2:
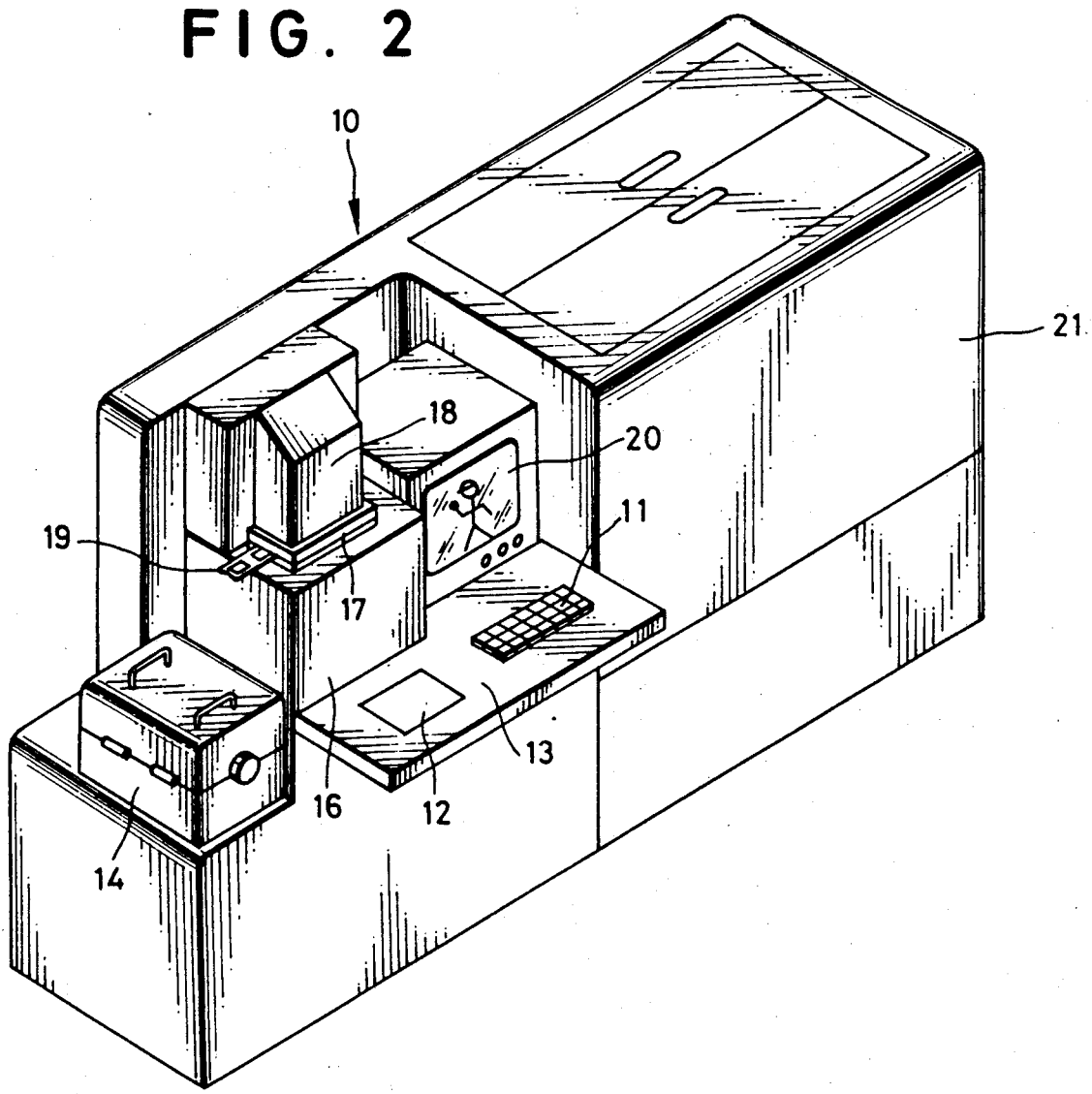
FIG. 2 is a perspective view of the photographic printerprocessor using the monitoring system of FIG. 1.

FIG. 2 shows an erect type photographic printer-processor 10 having both printing and processing functions. Provided in the front of the printer-processor 10 are a keyboard 11 and a light, table 12 disposed on a table 13. An operator stands in front of the table 13 to operate the printer-processor 10.

Figure 1:
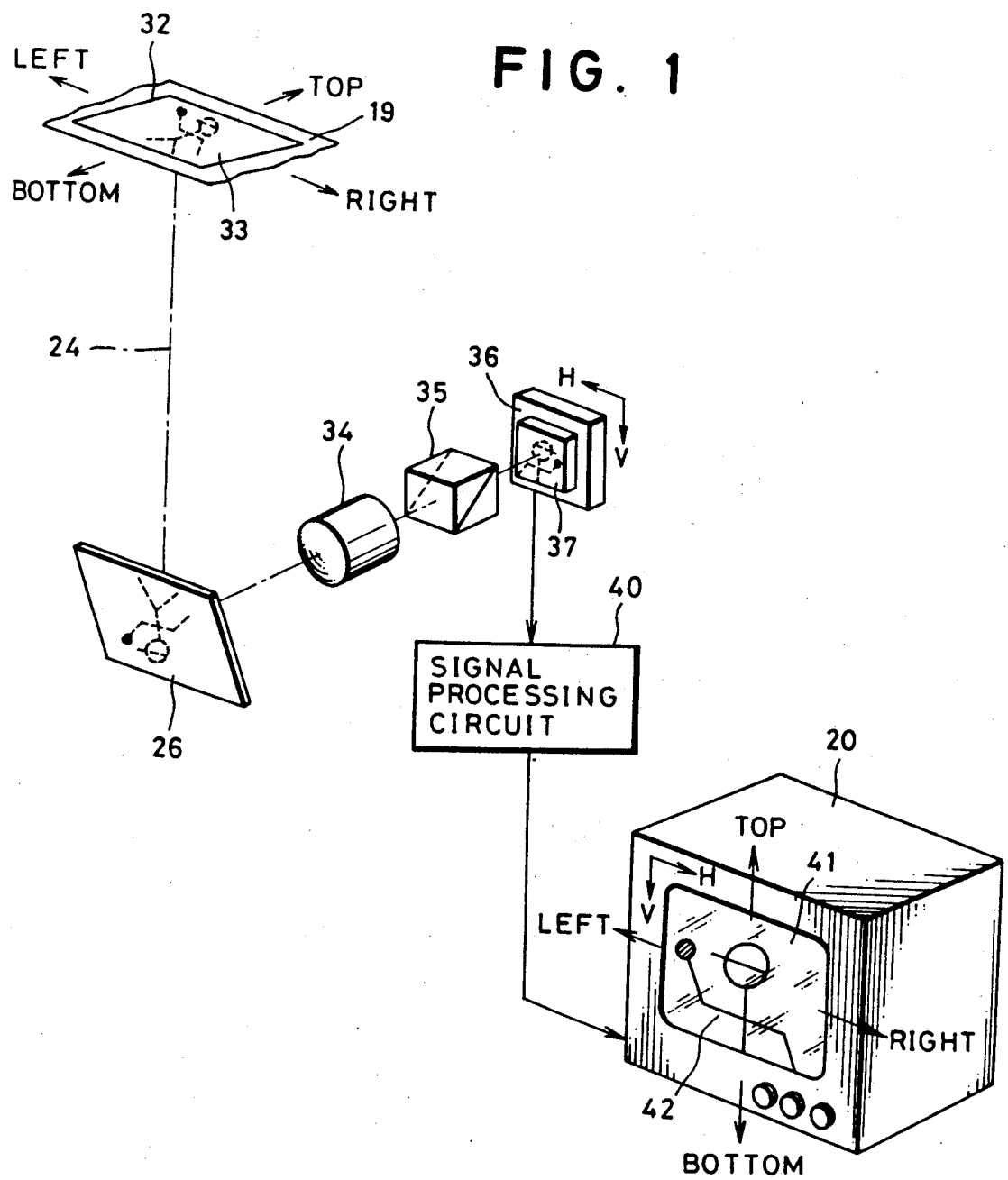
FIG. 1 is an explanatory view showing a monitoring system embodying the present invention.
Figure 3:
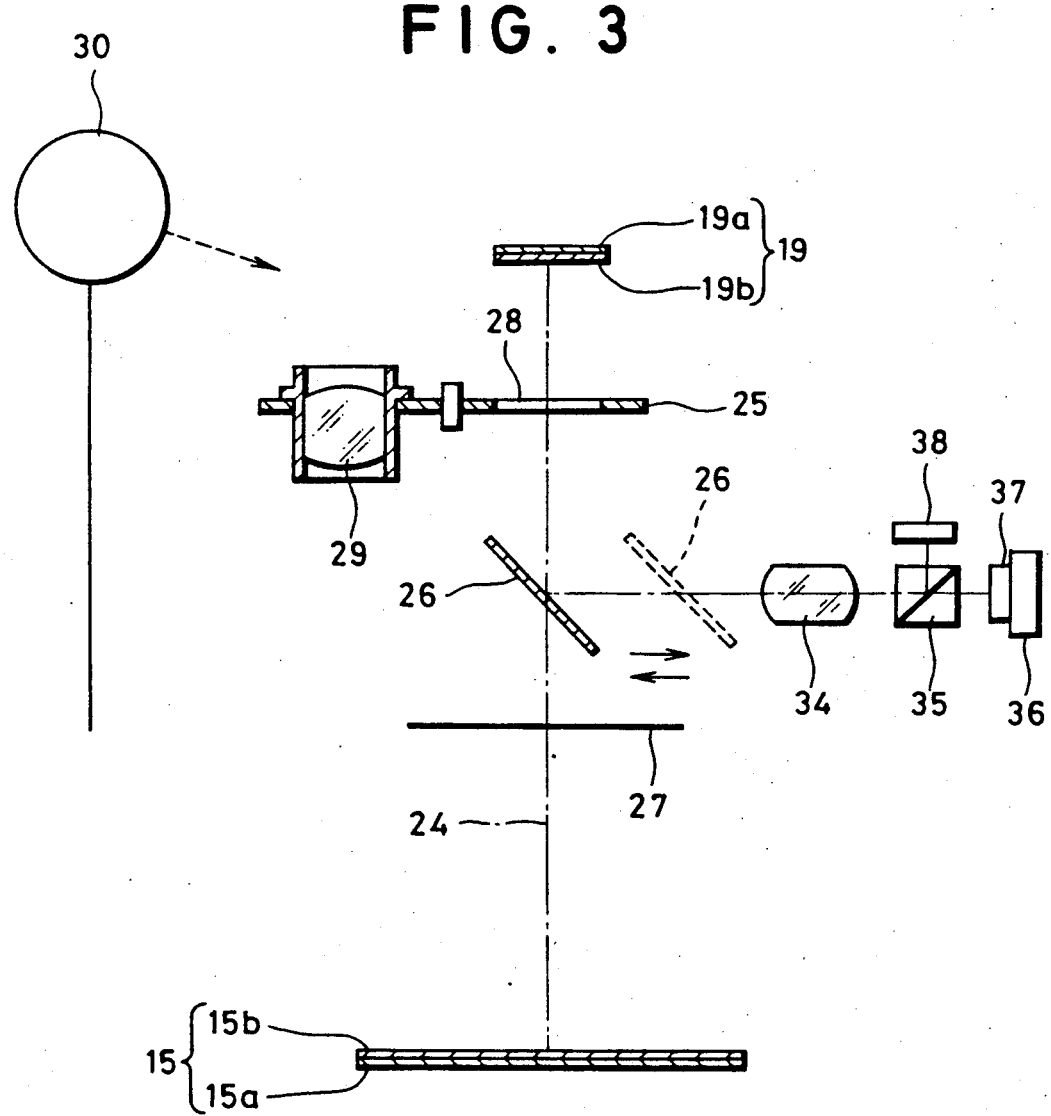
FIG. 3 is an explanatory view showing a printing optical system and an imaging system incorporated in the photographic printer-processor of FIG. 2.

In a magazine 14, a long photographic paper 15, shown in FIG. 3, is contained in a roll. The photographic paper 15 is withdrawn from the magazine 14 for each printing operation by a length sufficient to print one frame thereon and be sent to a printing section 16. Above the printing section 16, a film carrier 17 and a lamp housing 18 are disposed The film carrier 17 is removable toward the side of the operator and can hold a photographic film such as a negative film 19 with a plurality of frames, each of which has an original image 33, shown in FIG. 2. Referring to FIGS. 1 and 3, a printing light emanating from the lamp housing 18 illuminates a frame 32 so as to expose part of the photographic paper 15. The original image 33 on the frame 32 also is received by an imaging device during the overall process and monitored with a color CRT 20. Referring to FIG. 2, a processing section 21 processes and develops the exposed part of the photographic paper 15. Since the present invention mainly relates to the printing section 16, description of the processing section will be omitted.

Prior to printing the negative film 19 is placed on the light table 12 so as to allow for observation of the original image 33 particularly with respect to its front and rear surfaces and top and bottom sides. Then, the film 19 is inserted in the film carrier 17 which has been previously removed. In the printer 10, the negative film 19 is placed in the film carrier 17 such that the front surface having emulsion layers is disposed downwardly and preferably arranging the bottom of the frame toward the operator 30 (FIG. 3). Next, the film carrier 17 holding the film 19 is inserted in an exposure stage of the printing section 16. Since a positive image (screen image) 32 is displayed on the screen of the color CRT 20 due to negative-to-positive conversion, the operator 30 operates the keyboard 11 for color and density correction according to the operator s evaluation of the screen image 42. The screen image 42 is displayed by electrical processes including negative-to-positive conversion in order to simulate a photograph of the original image 33. When the image 33 is partially enlarged, the operator 30 manually adjusts the position of the negative film 19 in the film carrier 17 for the trimming operation observing the screen image 42 on the color CRT 20. At this time, the film 19 can be moved in the same direction as that on the screen 41 because the screen image 42 exactly corresponds to the original image 32 in their directional relation After the film setting and negative inspection for color and density correction, a print start key of the keyboard 11 is depressed for exposing the original image 33 on part of the sheet of the photographic paper 15, and thereafter the exposed part is developed in the processing section 21.

Referring now to FIGS. 1 and 3, the printing optical system and imaging system of the printer 10 will be explained The developed negative film 19, comprising a base 19a and emulsion layers 19b having the original image 32 recorded thereon is placed upside down in the film carrier 17 (FIG. 2) with the emulsion layers 19b down and with the bottom toward the operator 30. Facing the emulsion layers 19b of the film 19 the photographic paper 15 comprising a base 15a and a photosensitive emulsion layers 15b, is placed at an exposure stage of the printing section 16 (FIG. 2). Between the film 19 and the photographic paper 15, a turret 25, a slidable mirror 26, and a shutter 27 are disposed. The turret 25 is provided with two openings one opening 28 being used for monitoring and the other opening holding a printing lens 29 exchangeably. The slidable mirror 26 can be positioned in a functional position (shown by solid lines) and a non-functional position (shown by dotted lines) by sliding movement Instead of the slidable mirror 26, a pivotable mirror may be used as well.

On monitoring, the opening 28 is set on a printing optical axis 24 by turning the turret 25 about an axis parallel to the optical axis 24, and the slidable mirror 26 is set in the functional position on the printing optical axis 24.

On the other hand, when printing, the printing lens 29 is alternatively aligned with the printing optical axis 24 and the slidable mirror 26 is placed in the non-functional position so as not to disturb the printing Upon opening the shutter 27, an image enlarged with the printing lens 29 is printed on the photographic paper 15 which is thereafter transported in a direction vertical to the plane of FIG. 3

The slidable mirror 26 is placed on the printing optical axis 24 at an inclination of 45 degrees relative to the printing optical axis 24 so as to reflect the light perpendicularly to the printing optical axis 24 in a direction opposite to the side of the operator 30. The reflected light is received by an imaging device 36 through a zoom lens 34 and a beam splitter 35, forming an image 37 on an imaging surface of the imaging device 36. The zoom lens 34 is adjusted in focal length according to the size of the frame 32 so as to form an image having the same size. The beam splitter 35 partially reflects the light from the zoom lens 34 upwardly to a well-known photometering unit 38 used for calculation of the amount of exposure.

The imaging device 36 employs a CCD image sensor to arrange the read start position in the upper right hand corner. Generally, CCD image sensors are made to be arranged with read start position in the lower left hand corner in an imaging apparatus, for example, TV cameras. Therefore, the CCD image sensor is rotated 180 degrees in its imaging plane relative to the usual posture. In FIG. 1, for schematical representation of the read start position, the directions of horizontal and vertical scannings "H" and "V" are indicated by arrows. This placement of the CCD image sensor enables the displaying of the screen image 42 to coincide with the original image 33 in directional relation.

Video signals from the imaging device 36 are sent to a signal processing circuit 40 for simulating the characteristics of the photographic paper 15. Video signals processed in the signal processing circuit 40 are further sent to a color CRT 20 for displaying the screen image 42 on a screen 41 of the color CRT 20. In the color CRT 20, the scanning start position is in the upper left hand corner, and the scanning line runs from left to right, as is well known.

The negative film 19 is turned over with the emulsion layers 19b down and placed with the bottom of the image towards the operator 30. Therefore, when the film carrier 17 is drawn out to observe the frame 32, the original image 33 on the frame 32 has the same composition as that which was viewed in the viewfinder of the photographic camera when the object was taken. The image, after reflection of the slidable mirror 26, is inverted only with respect to right-and-left directions in comparison with the original image 33 on the negative film 19. The screen image 42 on the color CRT 20 is directionally the same as the original image 33, as will be easily seen in FIG. 1. When the screen image 42 is intended to move rightwardly on the screen 41, the negative film 19 is moved in the same direction, rightwardly. And, when the screen image 42 is intended to move upwardly on the screen 41, the film 19 is moved upwardly.

Instead of the slidable mirror 26 for total reflection, a half mirror which can be fixedly disposed in the printing optical path may be employed.

It is to be understood that the form of the present invention herein shown and described is to be taken as a preferred example of the same and that various changes may be made without departing from the spirit of the invention or the scope of the claims.

What is claimed is:

1. A photographic printer, having a printing optical path, for printing an original image, recorded in the emulsion layers of a photographic film on photosensitive emulsion layers of photosensitive material, said photographic film being placed with the emulsion layers down, said photographic printer comprising:
   a light source for transmitting light;
   reflecting means for reflecting said light passing through said printing optical path perpendicularly to the printing optical path;
   imaging means having a read start position in an upper right hand corner thereof as viewed from said reflecting means;
   a lens system disposed between said reflecting means and said imaging means so as to form an image of the original image on the imaging means; and
   a monitor for displaying a screen image of the original image on a screen thereof, said screen image coinciding with the original image in directional relation.

2. A photographic printer as claimed in claim 1, further comprising signal processing means for simulating the characteristics of said photosensitive material so as to display said screen image similar to an image on a color print which is to be made from the original image.

3. A photographic printer as claimed in claim 2, wherein said photographic film is disposed in the printing optical path with a top of the frame of the photographic film being disposed on a side opposite the front of the printer, and said monitor is disposed so as to be in the same direction as said image means.

4. A photographic printer as claimed in claim 3, wherein said reflecting means is a mirror which is removable from the printing optical path during printing.

5. A photographic printer as claimed in claim 3 wherein said lens system is a zoom lens in which the focal length is adjustable according to the size of the frame of the photographic film.

6. A photographic printer as claimed in claim 5, wherein said monitor is a CRT.

7. A photographic printer as claimed in claim 6, wherein said imaging means is a CCD image sensor.

8. A photographic printer as claimed in claim 7, further comprising a lens turret disposed between said photographic film and said reflecting means, said lens turret being provided with at least one printing lens placed in the printing optical path during the printing and an opening placed in the printing optical path during monitoring.

* * * * *